(12) United States Patent
Miller et al.

(10) Patent No.: US 7,324,940 B1
(45) Date of Patent: Jan. 29, 2008

(54) SPEECH RECOGNITION CONCEPT CONFIDENCE MEASUREMENT

(75) Inventors: Edward S. Miller, San Diego, CA (US); James F. Blake, II, San Diego, CA (US); Kyle N. Danielson, San Diego, CA (US); Keith C. Herold, San Diego, CA (US)

(73) Assignee: Lumen Vox, LLC, San Diego, CA (US)

( * ) Notice: Subject to any disclaimer, the term of this patent is extended or adjusted under 35 U.S.C. 154(b) by 812 days.

(21) Appl. No.: 10/789,389

(22) Filed: Feb. 27, 2004

Related U.S. Application Data

(60) Provisional application No. 60/451,227, filed on Feb. 28, 2003.

(51) Int. Cl.
*G10L 15/00* (2006.01)

(52) U.S. Cl. .................................. 704/240; 704/256

(58) Field of Classification Search ............... 704/240, 704/256
See application file for complete search history.

(56) References Cited

U.S. PATENT DOCUMENTS

| | | | |
|---|---|---|---|
| 5,384,892 A | 1/1995 | Strong | |
| 5,390,278 A | 2/1995 | Gupta et al. | |
| 5,615,296 A | 3/1997 | Stanford et al. | |
| 5,649,057 A | 7/1997 | Lee et al. | |
| 5,719,921 A | 2/1998 | Vysotsky et al. | |
| 5,774,628 A | 6/1998 | Hemphill | |
| 5,867,817 A | 2/1999 | Catallo et al. | |
| 6,006,183 A | 12/1999 | Lai et al. | |
| 6,006,185 A | 12/1999 | Immarco | |
| 6,298,324 B1 | 10/2001 | Zuberec et al. | |
| 6,434,521 B1 | 8/2002 | Barnard | |
| 7,162,423 B2 * | 1/2007 | Thrasher et al. | 704/251 |
| 7,219,059 B2 * | 5/2007 | Gupta et al. | 704/240 |
| 2001/0037200 A1 | 11/2001 | Ogawa et al. | |
| 2002/0049593 A1 | 4/2002 | Shao | |
| 2002/0133341 A1 | 9/2002 | Gillick et al. | |
| 2002/0161581 A1 | 10/2002 | Morin | |
| 2002/0173958 A1 | 11/2002 | Asano et al. | |
| 2005/0075877 A1 * | 4/2005 | Minamino et al. | 704/254 |

* cited by examiner

*Primary Examiner*—Daniel Abebe
(74) *Attorney, Agent, or Firm*—Knobbe Martens Olson & Bear LLP

(57) ABSTRACT

Systems and methods for determining a confidence score associated with a decoding output of a speech recognition engine. In one embodiment, a method of determining the confidence score comprises arranging time frame and acoustic score data into an array, determining a phoneme sequence in the array that yields the highest sum of acoustic scores under certain constraints, e.g., minimum number of time frames and order of phonemes in a phoneme string. A relative score is derived by applying a functional relationship between the acoustic score and different sums comprising acoustic scores from the array. The confidence score, in some embodiments, depends at least in part on the relative score and a measure of ambiguity associated with similar sounding phrases being included in different concepts of a specified grammar.

12 Claims, 4 Drawing Sheets

|          | Time (ms) | | | | | | | | |
|----------|-----|------|-----|-----|-----|-----|-----|-----|-----|
|          | 1   | 2    | 3   | 4   | 5   | 6   | 7   | 8   | 9   |
| AA       | .2  | .2   | .3  | .4  | .2  | .1  | .7  | .2  | .1  |
| EH       | .3  | .3   | .4  | .5  | .6  | .7  | .3  | .2  | .6  |
| IH       | .25 | .2   | .2  | .2  | .3  | .2  | .1  | .2  | .3  |
| S        | .1  | .3   | .1  | .2  | .4  | .2  | .5  | .6  | .7  |
| T        | .5  | .2   | .2  | .3  | .2  | .7  | .4  | .6  | .7  |
| Y        | .7  | .65  | .5  | .4  | .3  | .2  | .2  | .2  | .2  |

Phonemes (row labels at left)

FIG. 4

SPEECH RECOGNITION CONCEPT CONFIDENCE MEASUREMENT

RELATED APPLICATIONS

This application claims the benefit under 35 U.S.C. § 119(e) of U.S. Provisional Application No. 60/451,227, filed Feb. 28, 2003 and titled "SPEECH RECOGNITION CONCEPT CONFIDENCE MEASUREMENT," which is hereby incorporated by reference. This application is related to U.S. patent application Ser. No. 10/317,837, filed Dec. 10, 2002 and titled "SPEECH RECOGNITION SYSTEM HAVING AN APPLICATION PROGRAM INTERFACE," which is hereby incorporated by reference.

BACKGROUND OF THE INVENTION

1. Field of the Invention

The invention relates to speech recognition technology. More particularly, the invention relates to systems and methods for determining the likelihood that the decoding output of a speech recognition engine matches the speech input to the speech recognition engine.

2. Description of the Related Technology

Speech recognition, also referred to as voice recognition, generally pertains to the technology for converting voice data to text data. Typically, in speech recognition systems the task of analyzing speech in the form of audio data and converting it to a digital representation of the speech is performed by an element of the system referred to as a speech recognition engine. Traditionally, the speech recognition engine functionality has been implemented as hardware components, or by a combination of hardware components and software modules. More recently, software modules alone perform the functionality of speech recognition engines. The use of software has become ubiquitous in the implementation of speech recognition systems in general and more particularly in speech recognition engines.

Software application programs sometimes provide a set of routines, protocols, or tools for building software applications, commonly referred to as an application program interface (API), or also sometimes referred to as an application programmer interface. A well-designed API can make it easier to develop a program by providing the building blocks a programmer uses to puts the blocks together in invoking the modules of the application program.

The API typically refers to the method prescribed by a computer operating system or by an application program by which a programmer writing an application program can make requests of the operating system or another application. The API can be contrasted with a graphical user interface (GUI) or a command interface (both of which are direct user interfaces), in that the APIs are interfaces to operating systems or programs.

Most operating environments, e.g., Windows from Microsoft Corporation being one of the most prevalent, provide an API so that programmers can write applications consistent with the operating environment. Although APIs are designed for programmers, they are ultimately good for users because they ensure that programs using a common API have similar interfaces. Common or similar APIs ultimately make it easier for users to learn new programs.

However, current speech recognition system APIs suffer from a number of deficiencies. Some are hardware dependent, making it necessary to make time consuming and expensive modification of the API for each hardware platform on which the speech recognition system is executed. Others are speaker dependent, requiring extensive training for the system to become accustomed to a particular voice and accent. Additionally, current speech recognition systems do not allow dynamic creation and modification of concepts and grammars, thereby requiring time consuming recompilation and reloading of the speech recognition system software. Some speech recognition systems do not utilize flexible phrase formats, e.g., normal, Backus Naur Form (BNF), and phonetic formats. In addition, current speech recognition systems do not allow dynamic concepts with multiple phrases. Current speech recognition systems also do not have a voice channel model or grammar set model to allow multiple simultaneous decodes for each speech port using different combinations of grammar and voice samples.

Therefore, what is needed is a system and method for a speech recognition system API that solves the above deficiencies by allowing flexible, modifiable and ease of use capabilities, including, e.g., being hardware independent, speaker independent, allowing dynamic creation and modification of concepts and grammars and concepts with multiple phrases, utilize flexible phrase formats, and have a voice channel model or grammar set model to allow multiple simultaneous decodes for each speech port using different combinations of grammar and voice samples.

SUMMARY OF CERTAIN INVENTIVE EMBODIMENTS

The systems and methods disclosed here have several aspects, no single one of which is solely responsible for desirable and/or inventive attributes of the systems and methods. Without limiting the scope of the systems or methods as expressed by any claims which may follow in a subsequent related application, some inventive features will now be briefly presented.

One aspect of the invention concerns a method of determining a confidence score for a speech recognition engine's decoding of a speech input, where the engine decodes the speech input using a grammar comprising a plurality of phonemes. The method comprises receiving an ordered string of phonemes, wherein the phonemes of the string are identified by the engine as being part of the speech input, wherein each phoneme is associated with a time frame, and wherein the speech input spans a time period comprising a plurality of time frames. The method further comprises receiving a phoneme acoustic score map, wherein the map comprises an acoustic score for each phoneme of the grammar at each of the plurality of time frames. The method further comprises determining a best path score (PS) for the ordered string of phonemes. The path may comprise a sequence of time frames ordered in the same manner as the order of the phonemes in the ordered string of phonemes. The best path can be a particular path, from among a plurality of permissible paths, which has the highest sum of the acoustic scores of the phonemes in the path. The method can further comprise obtaining a first sum (HS) comprising the addition of the highest acoustic scores in each of the time frames. The method can further comprise obtaining a second sum (LS) comprising the addition of the lowest scores in each of the time frames. The method can further comprise deriving the confidence score (RS) as a weighted average based at least in part on a functional relationship between PS, LS, and HS.

In some embodiments of the above method the functional relationship is $RS=(PS-LS)/(HS-LS)$. In some embodiments of the above method, the grammar comprises phrases, each phrase comprising a string of phonemes, and the method further comprises determining a RS for each of the phrases of the grammar. The phrases can be grouped into concepts, at least one of which comprises the ordered string of phonemes. In some embodiments, the above method further comprises comparing the RS of each of the phrases of the concepts not comprising the ordered string of phonemes against the RS of the ordered string of phonemes. In another embodiment, the RS of the ordered string of phonemes is reduced if the RS of one of the phrases of the concepts not comprising the ordered string is greater or equal to the RS of the ordered string.

Another feature of the invention is directed to a method of assigning a confidence score to a speech recognizer's decoding of a speech input, where the recognizer employs a grammar comprising a plurality of phonemes, and wherein different combinations of the phonemes comprise phrases. The speech input spans a time period comprising a plurality of time frames. The method comprises creating a phoneme acoustic score map, wherein the map comprises an acoustic score for each phoneme of the grammar, and wherein each phoneme has an acoustic score for each of the time frames. The method further comprises determining an arrangement of phonemes, associated with the speech input, in consecutive frames that yields the highest overall acoustic score (PS), wherein the phonemes associated with the speech input form a phrase. The method further comprises normalizing PS based on one or more measures of the acoustic scores of the map.

In some embodiments, the method can further comprises selecting a path from among multiple permissible paths that maximizes the sum of the acoustic scores of the phonemes associated with the speech input. The one or more measures may comprise at least one of a sum (HS) of the highest acoustic scores for each time frame and the sum (LS) of the lowest acoustic scores for each time frame. The method can further comprise normalizing by evaluating the expression RS=(PS−LS)/(HS−LS). In some embodiments, the method further comprises computing a score for the best path for each of a plurality of phrases, wherein each of the phrases comprises a combination of phonemes of the grammar. In some embodiments, the method further comprises reducing PS if a best path score of the other phrases is substantially close to PS.

BRIEF DESCRIPTION OF THE DRAWINGS

The above and other aspects, features and advantages of the invention will be better understood by referring to the following detailed description, which should be read in conjunction with the accompanying drawings. These drawings and the associated description are provided to illustrate certain embodiments of the invention, and not to limit the scope of the invention.

FIG. 4 is a table illustrating an exemplary phoneme score map that may be used with the process shown in FIG. 3.

DETAILED DESCRIPTION OF CERTAIN EMBODIMENTS

The following presents detailed descriptions of specific inventive embodiments of the inventive systems and methods. However, the inventive systems and methods can be embodied in a multitude of different ways. In the descriptions, reference is made to the drawings wherein like parts are designated with like numerals throughout.

Programmers can use a Speech Recognition Engine Application Programming Interface ("API") to integrate speech, recognition functionality into their applications, without having to develop their own speech recognizer. Programmers can use the API to access a Speech Recognition Engine ("SRE"), namely, the component that performs the speech recognition. By way of illustration only, some of the activities that can be performed in conjunction with an SRE include (1) acquiring audio data, (2) specifying a grammar, (3) running the recognition process with the aid of the SRE, and (4) retrieving the recognition results.

Acquiring the audio data is an application-level task in certain embodiments. In other words, the programmer supplies a mechanism to acquire the audio data, e.g., through a microphone, telephone, or other collection or audio input device. Some embodiments of the API do not provide the method for acquiring the audio data, instead the API receives the audio data after it has been collected. Thus, the API can be independent of the sound hardware, in that the programmer can specify multiple audio sources concurrently.

Specifying a grammar (or "grammar specification") refers to providing a list of concepts, where a concept typically has a single meaning for a given application. Each concept can include a list of words, phrases, or pronunciations that share a single meaning labeled by the concept. The programmer can begin the recognition process by providing the audio data and specifying the grammar for the SRE to perform recognition. The programmer can retrieve the SRE's recognition results as list of concepts the SRE finds in the audio data. The SRE can list the concepts in order of appearance in the audio data. In addition to obtaining concepts, the programmer can also retrieve the specific words, phrases, or pronunciations the SRE finds in the audio data.

Figure 1:
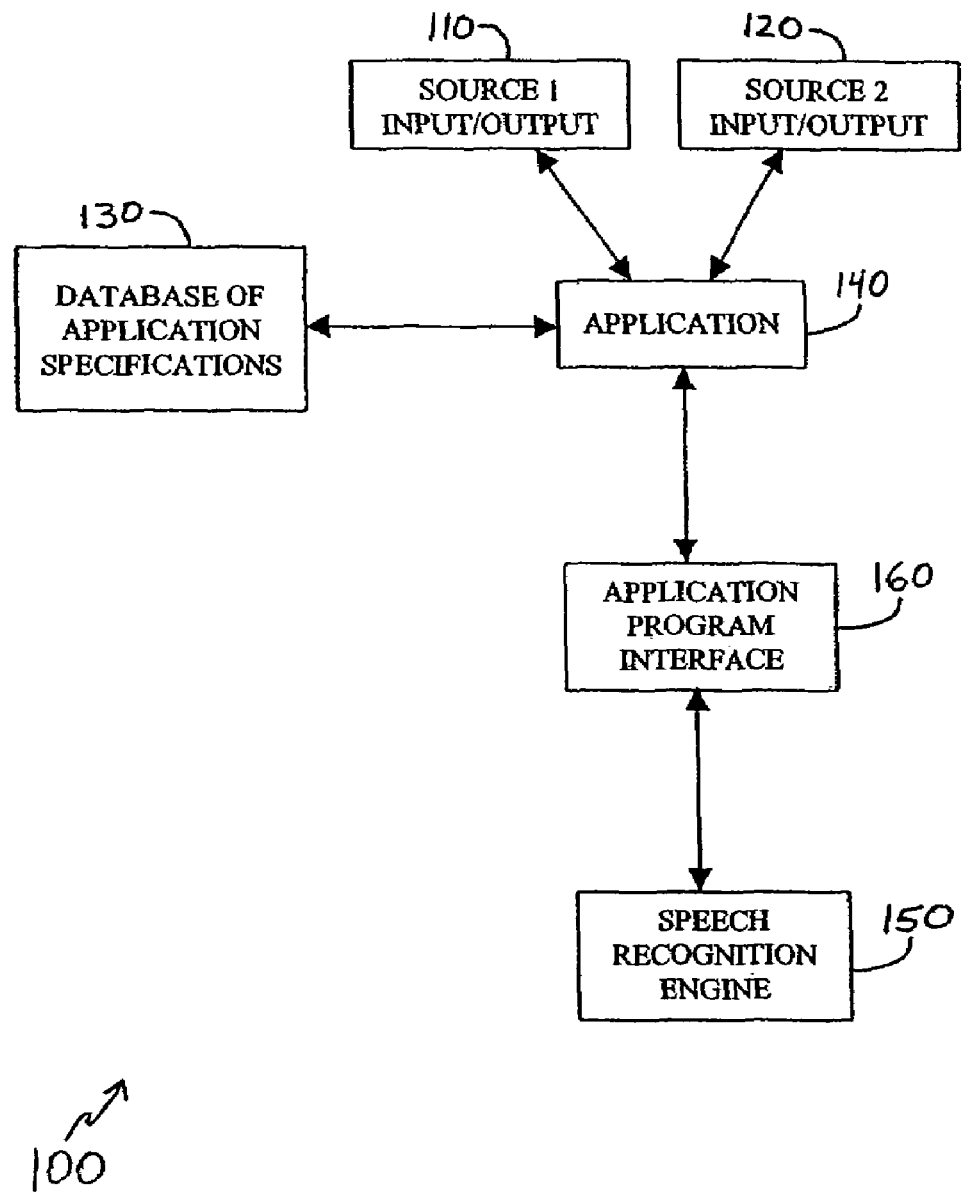
FIG. 1 is a top-level diagram of an exemplary speech recognition system configuration, in which a speech recognition engine having a confidence scoring module operates.

Referring now to the figures, FIG. 1 is a top-level diagram of an exemplary embodiment of a speech recognition system 100 configuration in which an SRE 150 can be configured with functionality to determine a confidence score for the concepts it identifies in audio data input. In this embodiment, the system 100 includes an application 140, which may be one or more modules that customize the system 100 for a particular use. The application 140 can be part of, or separate from, the system 100. Additionally, the programmer or user of the system 100 can develop and provide the application 140.

In this embodiment, the system 100 includes input/output audio sources, shown in FIG. 1 as a source 1 input/output 110 and a source 2 input/output 120. While two audio sources are shown in FIG. 1, the system 100 can have one or multiple input/output audio sources. The audio sources 110 or 120 can be of various types, e.g., a microphone, a personal computer audio card, a public switched telephone network, integrated services digital network, fiber distributed data interface, or other audio input/output source.

Some embodiments of the system 100 also include a database of application specifications 130 for storing, for example, grammar, concept, phrase format, vocabulary, and decoding information. The system 100 can additionally include a SRE 150. The functions of the SRE 150 can include processing spoken input and translating ("decoding") it into a form that the system 100 understands. The application 140 can interpret the result of the decoding as a command, or further process the recognized audio information. The system 100 can additionally include a speech recognition engine application program interface (API) 160 (or "speech port API") that facilitates programmer or user interaction with the SRE 150.

Figure 2:
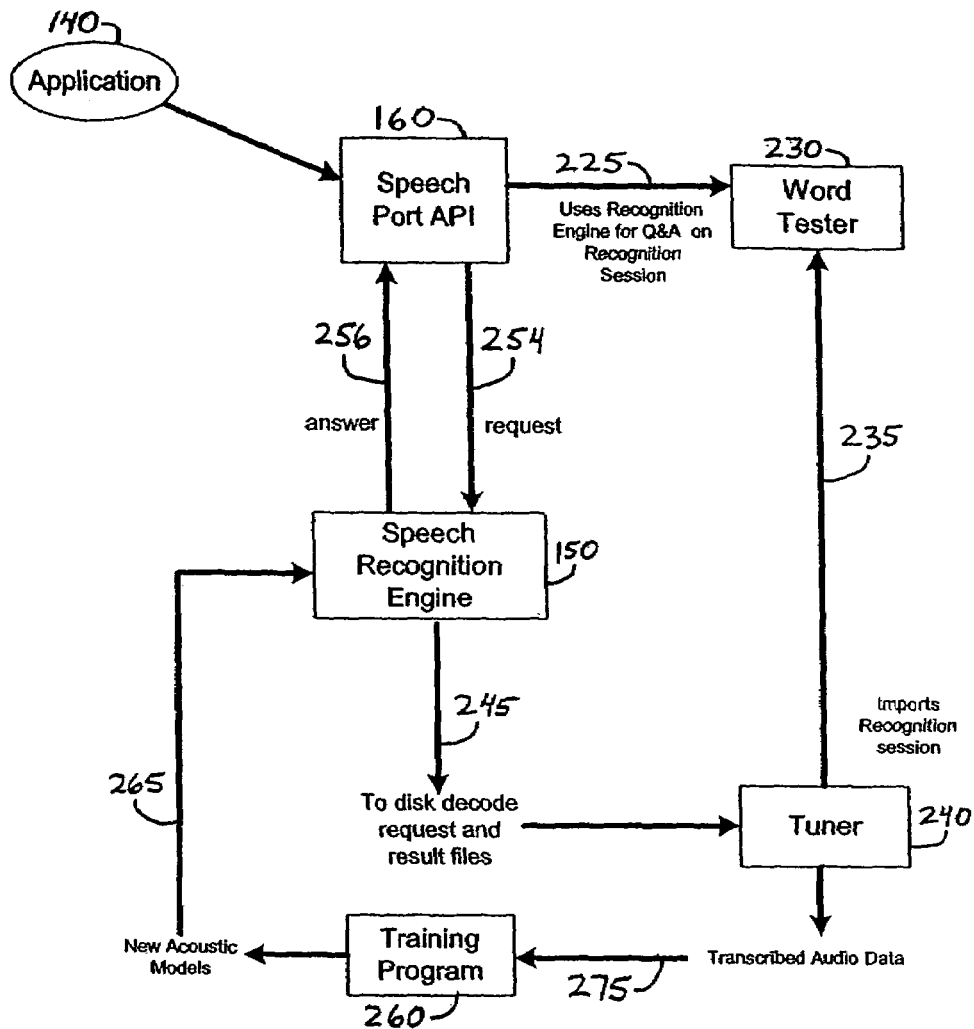
FIG. 2 is a diagram of yet another exemplary speech recognition engine configuration having a speech recognition engine with confidence scoring functionality.

FIG. 2 is a diagram of an embodiment of a SRE 150 configuration illustrating the connectivity of an API 160 with the speech ports. The application 140 is shown in FIG. 2 as an oval to illustrate that in this embodiment the application 140 is not integral to the SRE 150 but is developed and provided by the user of the system 100. In this embodiment, the user-developed application 140 interacts with the speech port API 160. The speech port API 160 interacts with a word tester module 230 (as illustrated by an arrow 225), e.g., for invoking the SRE 150 for questions and answers (Q&A) on the recognition session. The speech port API 160 interacts with the SRE 150, e.g., for communicating a request to decode audio data (as illustrated by an arrow 254), and for receiving an answer to the decode request (as illustrated by an arrow 256).

The word tester module 230 can also interact with a tuner module 240, e.g., for receiving from the tuner module 240 information regarding a recognition session (as illustrated by an arrow 235). The tuner module 240 receives from the SRE 150 information regarding the disk decode request and result files (as illustrated by an arrow 245). The tuner 240 can interact with a training program module 260, e.g., for communicating the transcribed audio data to the training program 260 (as illustrated by an arrow 275). The training program 260 can also interact with the SRE 150, e.g., transferring new acoustic model information to the SRE 150, as indicated by an arrow 265.

Figure 3:
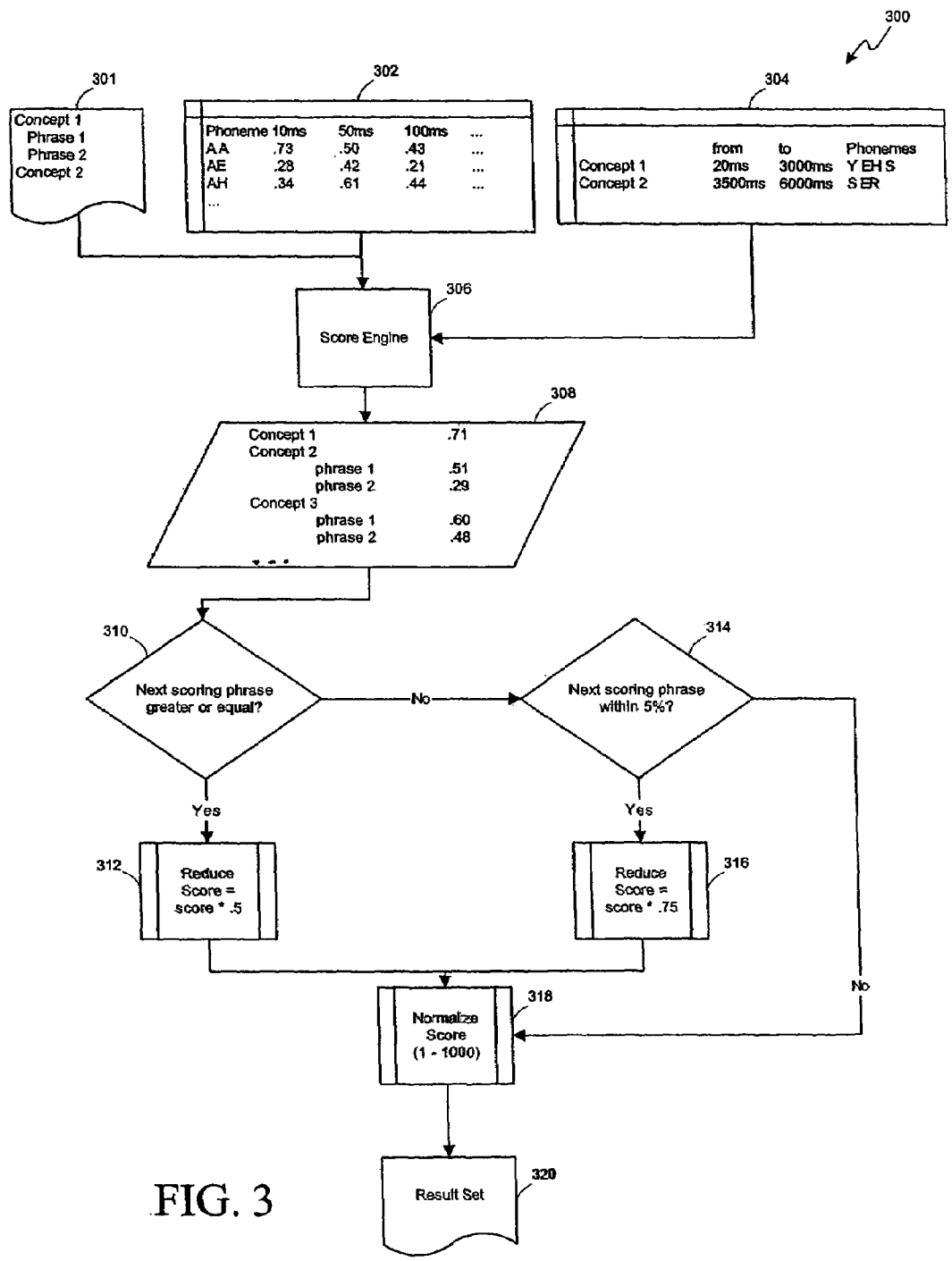
FIG. 3 is a flowchart illustrating an exemplary process of determining a confidence score in accordance with the invention.

FIG. 3 is a flowchart illustrating an exemplary process 300 of determining a confidence score. A reliable confidence score is useful because, for example, it decreases the need for excessive confirmation of spoken responses, and it also reduces the likelihood that the system 100 will accept incorrectly recognized responses. In one embodiment, the process 300 can be implemented in a system as the one shown in FIG. 7 of U.S. patent application Ser. No. 10/317,837 ("the '837 application"), which above was incorporated herein by reference. With reference to the mentioned FIG. 7, an API call 442 can be made to the decode result module 730 to retrieve results from the ordinal list of concept scores 736, which maintains the confidence scores for the concepts identified by the SRE 150 in an audio input. Of course, the systems and methods disclosed here for determining a confidence score are independent of any one API, or application 140, and can be practiced with any speech recognition system that uses a speech recognition engine that assigns acoustic scores to phonemes of a specified grammar, e.g., the well known, open source Sphinx speech recognition engines developed at Carnegie Mellon University. More information about the Sphinx engines, including modules that can be obtained for use with the systems and methods presented here, can be found at the following World Wide Web link available on this day of filing: <http://fife.speech.cs.cmu.edu/sphinx/>.

SRE 150 can be configured to determine a confidence score for each concept it identifies in an audio ("speech") input. As used here, a confidence score means a value (or "measure") that indicates how reliable the SRE 150 results are for a given concept the SRE 150 returns. In other words, the confidence score represents a probability-based determination of how likely the concept the SRE 150 finds actually occurs in the speech input. A programmer, or the application 140, can use the confidence score to determine if further processing is necessary to ensure a correct response. A score engine 306 can determine confidence scores after the SRE 150 identifies the concepts found in the speech input. The score engine 306 uses the grammar employed in the initial decoding, the identified concepts, along with the concepts' phrases and phonemes. A phoneme generally refers to a single sound in the sound inventory of the target language. By way of example, the concept may be "YES", the phrase may be "yes", and the phonemes would be "Y", "EH", and "S." Other phrases under the concept "yes" may include "yeah," "yup," "aye," etc., which would have their own associated phonemes.

As shown at a block 304, the SRE 150 identifies one or more concepts, as well as actual phonemes (i.e., a phoneme string) in the speech input for a given concept it identifies. In the example of block 304, the concepts are "yes" and "sir," with respectively corresponding phonemes "y", "eh", "s", and "s", "er." The SRE 150 also associates the concepts with a corresponding time period, and the actual phonemes with a time frame, as illustrated at blocks 302 and 304 (see also FIG. 4). Referencing block 304, the concept "yes" spans a time period from 20 milliseconds ("ms") to 3,000 ms, and "sir" spans from 3,500 ms to 6,000 ms.

By way of another example, referencing FIG. 4, the concept "yes" spans a time period from about 20 ms to about 880 ms. This time period is divided into time frames of a certain length, e.g., 10 ms, 20 ms, 30 ms, etc. In some embodiments, the length of the time frame is preferably about 25 ms, and more preferably about 10 ms In the example of FIG. 4, there are shown 9 time frames, each of which represents a time duration of 100 ms.

The SRE 150 arranges this data into a phoneme score map (block 302) of the acoustic scores for each phoneme at each time frame. The phoneme acoustic score is the probability of that phoneme being spoken in a given time frame. In one embodiment, the SRE 150 provides an acoustic score for each phoneme in the grammar, regardless of whether the phoneme appears in a given speech input. Hence, the map 302 includes a row for every phoneme of the specified grammar. The SRE 150 creates the phoneme score map 302 during the decoding process. As shown in FIG. 3, the map 302 has one row for each phoneme and one column for each time frame. The length of the time frame, in one embodiment, is about 10 ms. Of course, the number of time frames depends on the length of the speech input, which in many applications is not longer than several seconds. The SRE 150 uses the phoneme score map 302, phoneme string and a time frame range to create the confidence score. In one embodiment, the particular module that performs this calculation within the SRE 150 can be the score engine 306 of FIG. 3.

With reference to FIG. 4, to create a confidence score for a phoneme string of concept identified by the SRE 150, the score engine 306 performs a "best path" search through the phoneme score map 302. The score engine 306 creates a path through the phoneme score map 302 by selecting one phoneme per time frame. The score engine 306 begins at the first time frame and phoneme (e.g., 100 ms and "y" in FIG. 4) and ends at the last time frame and phoneme (e.g., 900 ms and "s" in FIG. 4). The string of phonemes the score engine 306 selects in creating the path is ordered the same way as the phoneme string of the phrase of the identified concept, and contains a minimum number of frames per phoneme in the string. By way of example, with reference to FIG. 4, if a phoneme string is "Y", "EH", "S", and the time frames span from 100 ms to 900 ms. A path may be "Y" from less than about 100 ms to over 300 ms (time frames 1, 2, and 3), "EH" from about 400 ms to over 600 ms (time frames 4, 5 and 6), and "S" from about 700 ms to near 900 ms (times frames 7, 8, and 9). The score engine 306 creates the initial confidence score for the phoneme string of a concept using the time frame range the SRE 150 identifies for that concept, in this example the concept "yes" has a time frame range from 0 ms to 900 ms. Of course, these values are only exemplary, and are not intended to limit the scope of the invention.

In one embodiment, the SRE 150 determines the minimum number of frames ("MF") per phoneme as follows. The SRE 150 divides the number of time frames ("NF") by the number of phonemes ("NP") in the string of phonemes to obtain a NF/NP value, which will be referenced as value A for convenience. The SRE 150 then determines MF by multiplying A by 0.6, i.e., MF=A*.6. The value 0.6 has been found to produce useful results.

In another embodiment, the SRE 150 can create a list of relative length ("RL") for each phoneme. In this example, the SRE 150 can make the average phoneme length to equal 1. If the phoneme "B", for example, is judged to be on average twice as long as the average length for all phonemes, then the length of "B" would be 2.0 in the list. An exemplary list may be "B"=2.0, "C"=1.9, "AH"=1.2, "AE"=1.0, and "ZH"=0.9, etc. Hence, MF becomes NF divided by the actual length ("AL") of the identified phonemes in the phoneme string from SRE 150 multiplied by RL, i.e., MF=(NF/AL)*RL.

The score engine 306 determines a path score ("PS") by summing the acoustic scores for the selected phonemes in the path. Using the phoneme score map 302, the score engine 306 determines a particular sequence of the phonemes (in consecutive frames) that yields the highest sum of the acoustic scores of the phoneme string making the path. Hence, the best path is the path (among all possible valid paths) with the highest PS.

After the score engine 306 finds the best path, the score engine 306 determines an "initial confidence score" in the following manner. For each time frame, the score engine 306 finds the highest acoustic score and adds it to HS, i.e., a variable representing the sum of the high acoustic scores in each time frame. The score engine 306 also finds the lowest acoustic score for each time frame and adds it to LS, i.e., a variable representing the sum of the low acoustic scores in each time frame. The score engine 306 then determines the initial confidence score (or relative probability score ("RS")) for the best path by using the following formula: RS=(PS−LS)/(HS−LS)

The range of RS is necessarily 0.0 to 1.0. The score engine 306 determines a RS for each concept the SRE 150 identifies at block 304.

As already explained, a concept groups words and phrases that for the purposes of a given application mean the same thing. Because similar sounding words may appear in different concepts, an ambiguity arises as to which of the different concepts is the concept that actually appears in the speech input. In one embodiment, the SRE 150 adjusts the RS of the identified concept to take into account this ambiguity. Of course, no ambiguity arises with regard to dissimilar words that have the same meaning within the application, that is, the different phrases associated with a given concept.

The score engine 306 calculates a RS for each phoneme string (i.e., phrase) associated with each concept of the active grammar, excluding the concept the score engine 306 has already scored (e.g., the identified concept 1 shown in block 308). The RS scores are stored in a list as shown at block 308. At a decision block 301, the SRE 150 determines whether the RS of any other phrase is greater than or equal to the RS of the identified concept. If this is the case, at a block 303 the SRE 150 reduces the RS of the identified concept by a significant amount, e.g., 50%. Otherwise, at a decision block 314 the SRE 150 determines whether the RS of the other phrase is close to the RS of the identified concept, e.g., within 5%. If this is the case, at a block 316 the SRE 150 reduces the RS by a less significant amount, e.g., 25%. The values 50%, 5%, and 25% are only illustrative and in no way the only ones that can be employed for determining the confidence. However, these values have been found to produce useful results. Depending on a specific application 140, it may be desirable to determine by experimentation the values that produce the best results for that application.

In this manner, the SRE 150 takes into account the ambiguity (or "confusability") discussed above. As used here, ambiguity or confusability refers to whether a concept existing in the grammar 301, other than the one identified by the SRE 150, also has a high probability of being correct over the same range of time frames. The SRE 150 excludes the other phoneme strings from the grammar for the identified concept because confusability within a concept is typically not a problem. That is, it is preferable that similar sounding words in the identified concept do not affect its RS. By way of example, the concept CALIFORNIA contains phrases California and Californians. If the speech input is "California," and the SRE 150 includes the RS for the phoneme string for Californians in evaluating confusability, the SRE 150 would reduce the RS for the concept CALIFORNIA. However, this should not be the case, because by including California and Californians in the same concept, the SRE 150 interprets both phrases to mean the same thing, namely the concept CALIFORNIA.

At a block 318, the SRE 150 normalizes RS, originally a number between 0.0 and 1.0, to a number between 0 and 1,000 (where 1,000 is a "best" score). In one embodiment, a normalized score of 500 on this scale is indicative of a likelihood threshold, i.e., a score over 500 can indicate that the SRE 150 is reasonably sure that the hypothesized concept is "correct," while a score of less than 500 can indicate that the SRE 150 is "not confident" that the hypothesized concept is correct. At a block 320, the SRE 150 can store the final confidence score for each concept into a result file (block 306). When the process 300 is implemented in conjunction with a system 100 such as that discussed in the '837 application, the concept scores can be stored in the result file 530 shown in FIG. 5 of the '837 application.

While the above detailed description has shown, described, and pointed out novel features of the invention as applied to various embodiments, it will be understood that various omissions, substitutions, and changes in the form and details of the devices or processes illustrated may be made by those skilled in the relevant technology without departing from the spirit of the invention.

What is claimed is:

1. A method of determining a confidence score for decoding of a speech input by a speech recognition engine, in which the engine decodes the speech input using a grammar comprising a plurality of phonemes, the method comprising:

receiving an ordered string of phonemes, wherein the phonemes of the string are identified by a speech recognition engine as being part of a speech input, wherein each phoneme is associated with a time frame, and wherein the speech input spans a time period comprising a plurality of time frames;

receiving a phoneme acoustic score map, wherein the map comprises an acoustic score for each phoneme of a grammar at each of the plurality of time frames;

obtaining a first sum comprising the addition of the highest acoustic scores in each of the time frames;

obtaining a second sum comprising the addition of the lowest scores in each of the time frames;

determining a confidence score for a best path for the ordered string of phonemes, wherein the confidence score is determined as a weighted average based at least in part on a functional relationship between the best path score, the second sum, and the first sum.

2. The method of claim 1, wherein the best path comprises a sequence of time frames ordered in the same manner as the order of the phonemes in the ordered string of phonemes.

3. The method of claim 1, wherein the best path is a particular path from among a plurality of permissible paths having the highest sum of acoustic scores of the phonemes in the particular path.

4. The method of claim 1, wherein the grammar comprises a plurality of phrases, each phrase comprising a string of phonemes.

5. A method of determining a confidence score for decoding of a speech input by a speech recognition engine in which the engine decodes the speech input using a grammar comprising a plurality of phonemes the method comprising:

receiving an ordered string of phonemes wherein the phonemes of the string are identified by a speech recognition engine as being part of a speech input wherein each phoneme is associated with a time frame, and wherein the speech input spans a time period comprising a plurality of time frames;

receiving a phoneme acoustic score map, wherein the map comprises an acoustic score for each phoneme of a grammar at each of the plurality of time frames, wherein the grammar comprises a plurality of phrases each phrase comprising a string of phonemes;

determining a confidence score for a best path for the ordered string of phonemes; and determining a confidence score for each of the phrases of the grammar, wherein the phrases are grouped into concepts, at least one of the concepts comprising the ordered string of phonemes.

6. The method of claim 5, further comprising obtaining a first sum comprising the addition of the highest acoustic scores in each of the time frames.

7. The method of claim 6, further comprising obtaining a second sum comprising the addition of the lowest scores in each of the time frames.

8. The method of claim 7, wherein the confidence score is determined as a weighted average based at least in part on a functional relationship between the best path score, the second sum, and the first sum.

9. The method of claim 5, further comprising comparing the confidence score for each of the phrases of the concepts not comprising the ordered string of phonemes against the confidence score of the ordered string of phonemes.

10. The method of claim 9, wherein the confidence score of the ordered string of phonemes is reduced if the confidence score of one of the phrases of the concepts not comprising the ordered string is greater or equal to the confidence score of the ordered string.

11. The method of claim 5, wherein the best path comprises a sequence of time frames ordered in the same manner as the order of the phonemes in the ordered string of phonemes.

12. The method of claim 5, wherein the best path is a particular path from among a plurality of permissible paths having the highest sum of acoustic scores of the phonemes in the particular path.

* * * * *